United States Patent
Tremaine et al.

(10) Patent No.: US 6,909,819 B1
(45) Date of Patent: Jun. 21, 2005

(54) SYSTEM AND METHOD FOR CANCELING DISTURBANCE MEMS DEVICES

(75) Inventors: Brian P. Tremaine, San Jose, CA (US); Joseph E. Davis, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 0 days.

(21) Appl. No.: 10/825,897

(22) Filed: Apr. 16, 2004

(51) Int. Cl.⁷ .................................................. G02B 6/26
(52) U.S. Cl. .......................... 385/17; 385/15; 385/16; 385/18
(58) Field of Search ......................... 385/15, 16, 17, 385/18, 24, 31, 33, 140

(56) References Cited

U.S. PATENT DOCUMENTS

| | | | |
|---|---|---|---|
| 5,668,680 A | 9/1997 | Tremaine | 360/18.07 |
| 6,360,036 B1 * | 3/2002 | Couillard | 385/19 |
| 6,388,359 B1 | 5/2002 | Duelli et al. | 310/309 |
| 6,532,096 B2 | 3/2003 | Berhane et al. | 359/230 |
| 6,539,142 B2 * | 3/2003 | Lemoff et al. | 385/18 |
| 6,549,699 B2 | 4/2003 | Belser et al. | 385/24 |
| 6,556,739 B1 * | 4/2003 | Kruglick | 385/17 |
| 6,625,346 B2 | 9/2003 | Wilde | 385/24 |
| 6,661,948 B2 | 12/2003 | Wilde | 385/24 |
| 6,678,437 B2 * | 1/2004 | Qian et al. | 385/18 |
| 6,687,431 B2 | 2/2004 | Chen et al. | 385/24 |
| 6,711,314 B1 * | 3/2004 | Mori et al. | 385/17 |
| 2004/0228577 A1 * | 11/2004 | Pezeshki et al. | 385/31 |

* cited by examiner

*Primary Examiner*—Brian M. Healy
(74) *Attorney, Agent, or Firm*—DLA Piper Rudnick Gray Cary LLP

(57) ABSTRACT

A system and method for canceling disturbance in a MEMS device. The system 200 includes a MEMS device 203, which may include a substrate 205 and a plurality of individually movable MEMS elements 203-1 through 203-N, and a control assembly 207. The optical system 200 may be utilized in and/or form a portion of any optical apparatus employing an array of MEMS devices. The control assembly 207 uses feed-forward control signals to cancel disturbance in the MEMS device 203, and more particularly, to cancel disturbance in the non-switched or static mirrors of the MEMS device 203 caused by switched or moving mirrors.

34 Claims, 4 Drawing Sheets

SYSTEM AND METHOD FOR CANCELING DISTURBANCE MEMS DEVICES

FIELD OF THE INVENTION

The present invention relates to micro-electro-mechanical systems (MEMS). More particularly, the present invention relates to a system and method for canceling disturbance in MEMS devices, such as an array of MEMS mirrors.

BACKGROUND

MEMS devices, such as MEMS mirrors, are effective in a variety of optical applications, including high-speed scanning and optical switching. FIG. 1 shows a prior art optical system, which employs an array of MEMS mirrors to couple light from input fibers to output fibers. Particularly, FIG. 1 depicts a wavelength-separating-routing (WSR) apparatus 100 including an array of fiber collimators 110, which provide one or more input and output ports (e.g., ports 110-1 through 110-N); a wavelength-separator, which in one form may be a diffraction grating 101; a beam-focuser in the form of a focusing lens 102; and a MEMS device 103, which may be an array of micromirrors.

In operation, a multi-wavelength optical signal emerges from one or more input ports, e.g., port 110-1. The diffraction grating 101 angularly separates the multi-wavelength optical signal into multiple spectral channels. Each spectral channel may represent a distinct center wavelength (e.g., $\lambda_i$) and associated bandwidth, and may carry a unique information signal as in WDM optical networking applications. The focusing lens 102 focuses the spectral channels into a spatial array of corresponding focused spots (not shown in FIG. 1). The channel micromirrors 103 are positioned in accordance with the spatial array formed by the spectral channels, such that each channel micromirror receives one of the spectral channels. The channel micromirrors 103 may be individually controllable and movable, e.g., pivotable (or rotatable) under analog (or continuous) control, such that, upon reflection, the spectral channels are directed into selected ones of the output ports (e.g., ports 110-2 through 110-N) by way of the focusing lens 102 and the diffraction grating 101. In this manner, the MEMS device 103 may be used to selectively couple the spectral channels between the input and output ports of the system. The system 100 may also include a quarter-wave plate 104, which causes each spectral channel to experience a total of approximately 90-degree rotation in polarization upon traversing the quarter-wave plate 104 twice. This and other examples of optical systems employing arrays of MEMS devices (e.g., micromirrors) are described in U.S. Pat. Nos. 6,687,431; 6,661,948; 6,625,346; and 6,549,699, which are assigned to the present assignee and incorporated herein by reference.

In optical systems employing MEMS devices, such as the system shown in FIG. 1, switching individual elements within a MEMS device can cause disturbances in neighboring elements. For example, switching mirrors in a MEMS array has been found to cause an aerodynamic coupling with other mirrors in the array that can disturb mirrors that are to remain static. Efforts have been made to cancel this disturbance in non-switched or static mirrors. These efforts have focused on selecting a control strategy to minimize the perturbing effects of the mirror being switched. For example, previous work has involved designing an optimal trajectory for the switched mirror, incorporating knowledge of the system dynamics, in order to minimize disturbances. One such solution is discussed in U.S. Pat. No. 5,668,680 of Tremaine. Other efforts include slowing the motion of the switched mirror, optimizing the voltage versus time profile that creates mirror motion, and providing a mechanical blockage between mirrors.

The present invention provides a system and method for canceling disturbance in a MEMS device that controls the non-switched elements in the MEMS device in a manner that resists perturbation.

SUMMARY OF THE INVENTION

The present invention provides a method and system for canceling disturbance in MEMS devices. The present invention utilizes a feed-forward control strategy to control non-switched elements in a MEMS device, effective to cancel perturbation caused by switched elements in the device. In one embodiment, the MEMS device may be an array of MEMS mirrors and the control strategy may be implemented using a conventional controller.

According to one aspect of the invention, an optical system is provided. The optical system includes a MEMS device, including a plurality of elements, which are individually movable; and a control assembly that is communicatively coupled to the MEMS device and that provides control signals to the plurality of elements for moving the elements, wherein the control signals include feed-forward signals to certain elements that substantially cancel disturbance caused by moving elements.

According to another aspect of the invention, an optical apparatus is provided for canceling disturbance in an array of MEMS mirrors, which are individually switchable. The apparatus includes a controller that is communicatively coupled to the MEMS mirrors and that communicates feed-forward signals to certain mirrors, effective to substantially cancel disturbances caused by switched mirrors.

According to another aspect of the invention, a method is provided for canceling disturbance in a MEMS device including a plurality of elements that are individually movable. The method includes providing feed-forward signals to one or more elements in the MEMS device, the feed-forward signals being effective to substantially cancel disturbance caused by moving elements in the MEMS device.

The novel features of this invention, as well as the invention itself, will be best understood from the following drawings and detailed description.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention can be accomplished using software, hardware, firmware or any combination thereof, as would be apparent to those of ordinary skill in the art, and the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Moreover, the optical beams representing the spectral channels shown in the following figures are shown for illustrative purpose only. For instance, their sizes and shapes are not drawn to scale. It should be further noted that subscript i in this specification may assume any integer value between 1 and N.

Figure 1:
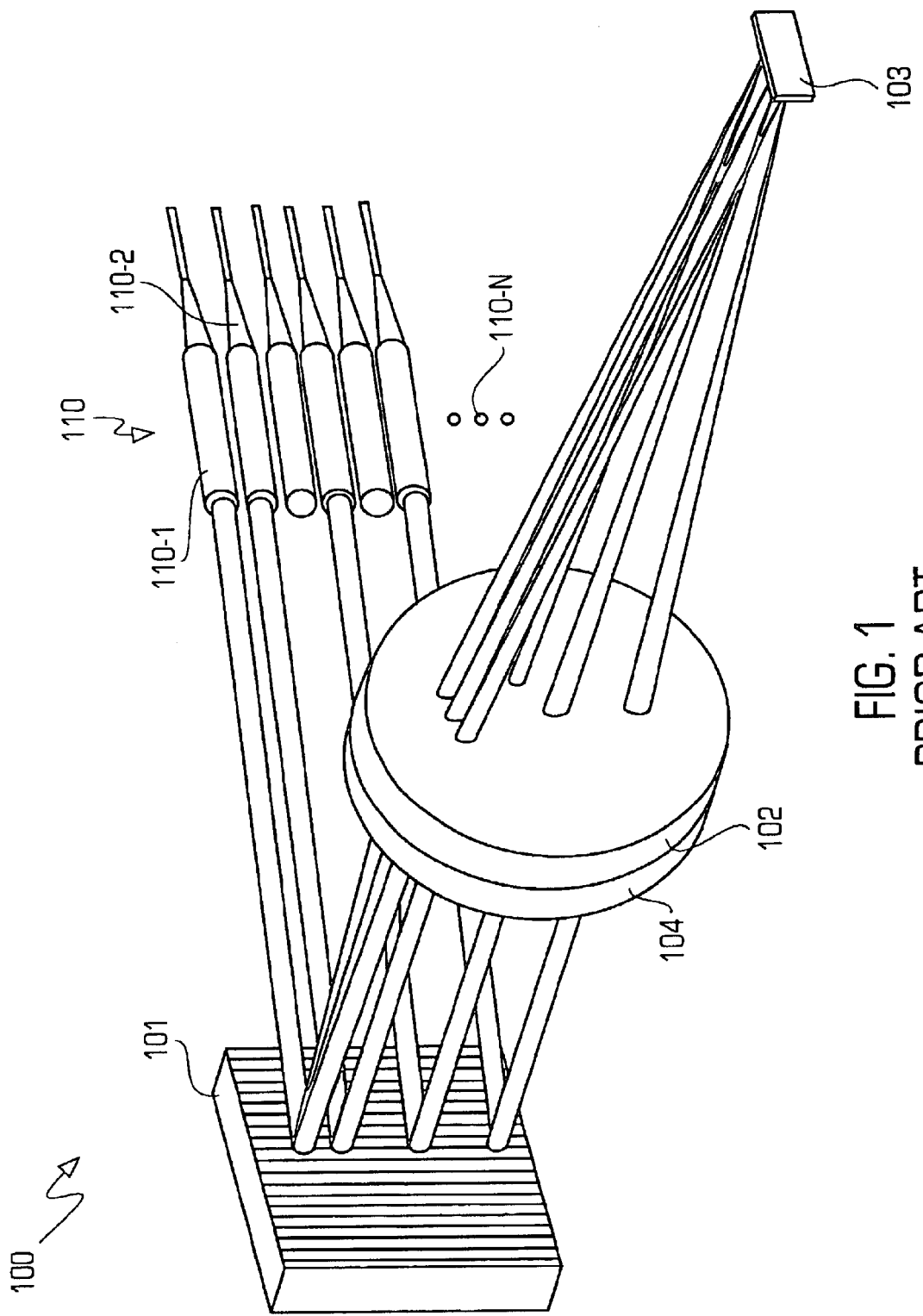
FIG. 1 is a schematic diagram of an optical apparatus employing an array of MEMS devices, according to the prior art.
Figure 2:
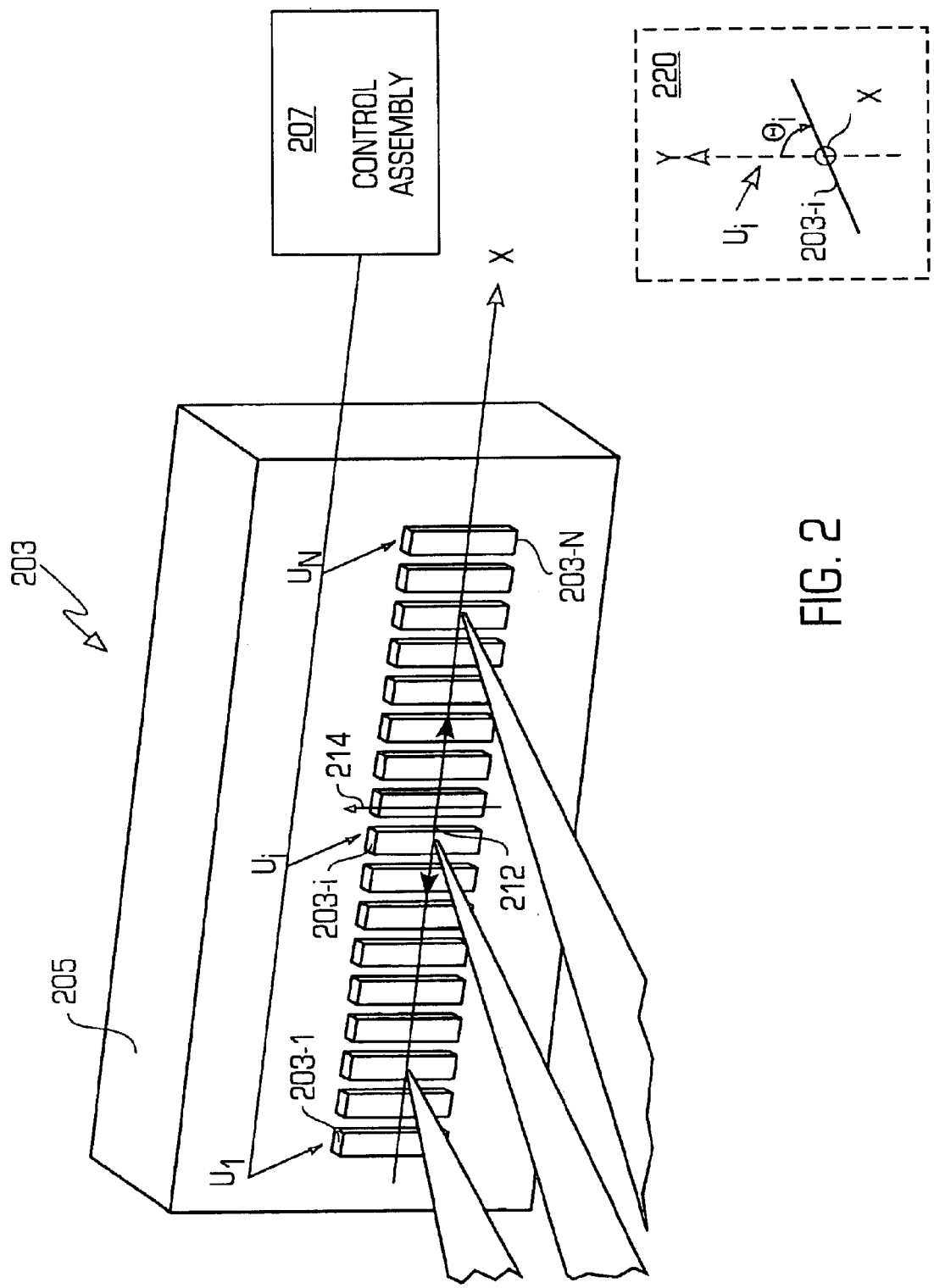
FIG. 2 is a schematic diagram illustrating an optical system including an array of MEMS devices, according to the present invention.

Depicted in FIG. 2 is a partial view of an optical system 200, according to the present invention. The optical system 200 includes a MEMS device 203, which may include a substrate 205 and a plurality of individually movable MEMS elements 203-1 through 203-N, and a control assembly 207. The optical system 200 may be utilized in and/or form a portion of any optical apparatus employing an array of MEMS devices, such as the apparatus shown in FIG. 1 or the apparatus described in any of the above-listed patents of the assignee. In one embodiment, the MEMS elements 203-1 through 203-N comprise micromirrors (e.g., silicon micromachined mirrors), similar to the micromirrors employed in the optical apparatus 100 shown in FIG. 1. In other embodiments, MEMS device 203 may include any type of pivotable, rotatable, switchable and/or movable optical elements. Furthermore, any number of channel micromirrors may be included in the array, and may correspond to the number of spectral channels in the optical system.

Figure 3:
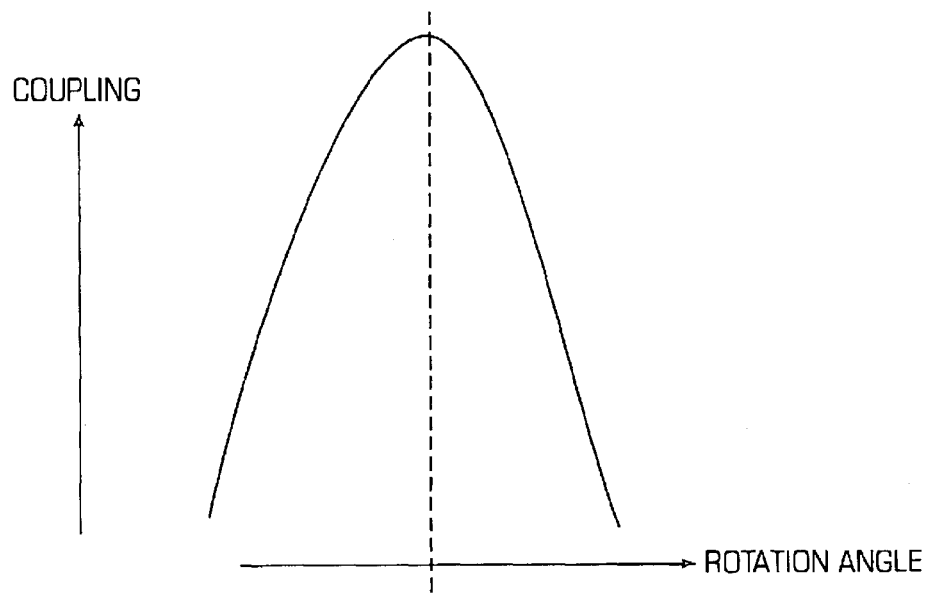
FIG. 3 is a typical optical coupling curve illustrating the relationship between the angle of a mirror in an optical system and the coupling of light exiting at a corresponding output port or collimator.

The micromirrors 203-1 through 203-N may be arranged in a one-dimensional array along the x-axis, and may be situated in an optical apparatus so as to receive the focused spots of spatially separated spectral channels in a one-to-one correspondence. While the micromirrors shown in FIG. 2 are a linear array of mirrors, the present invention can also apply to a two-dimensional array or matrix of mirrors. The reflective surface of each micromirror lies in the x-y plane as defined in the figure and is movable, e.g., pivotable (or deflectable), about a roll axis 212, which extends in the x-direction, and a pitch axis 214 that extends in the y-direction. The mirrors may be pivotable in a continuous manner, under analog and/or digital control. Each spectral channel, upon reflection, may be deflected in the x and y-directions relative to its incident direction, so as to be directed into an output port in an optical system (e.g., port 110-2 in system 100 shown in FIG. 1). FIG. 3 illustrates the relationship between the angle of a mirror and the optical coupling of a reflected beam with a corresponding output fiber in an optical system. Although micromirror array 203 illustrates MEMS mirrors having two axes of rotation, the present invention can apply to MEMS mirrors with any number of axes of rotation. Furthermore, while the present embodiment is described relative to electrostatic MEMS mirrors, the invention can also apply to MEMS mirrors with other methods of actuation such as voice-coil motor or magnetostatics.

In one embodiment, control assembly 207 includes a conventional microprocessor-based controller operating under stored program control. The controller may include DSP firmware and an FPGA device, which direct operation of the control assembly 207. In other embodiments, other types of hardware, software and/or firmware may be used to implement the invention. The control assembly 207 provides a set of mirror-control signals, e.g., voltage signals $U_i$ through $U_N$, controlling the movement of micromirrors 203-1 through 203-N. The micromirrors may be switched using DAC voltage values to command corresponding rotational angles. By way of example, dashed box 220 in FIG. 2 illustrates a schematic side view of a micromirror 203-$i$. In box 220, the micromirror is subject to a mirror-control signal $U_i$, and is consequently pivoting about the x-axis (pointing out of the plane of paper) at a pivoting angle $\theta_i$.

These mirror control signals (e.g., DAC values) are the control variable and will be represented by the symbol $u_k$ for the k-th mirror in the linear array. The disturbance on a mirror may be observed optically as a perturbation in power level measured in dBm. However, the disturbance considered in the present embodiment as the output variable is the mirror displacement angle, $\theta_k$, even though it is observed indirectly through the power level.

In operation, the control assembly 207 uses feed-forward control signals to cancel disturbance in the MEMS device 203, and more particularly, to cancel disturbance in the non-switched or static mirrors of the MEMS device 203. The control assembly 207 provides control signals to mirrors being switched or moved (the "switched mirrors") with a normalized profile, $f(\cdot)$, which minimizes coupling in neighboring mirrors (e.g., mirrors in relative close proximity to the switched mirrors). Particularly, the control assembly 207 is adapted to move mirror k between any two positions of $\theta_k$ using the control $u_k$ while minimizing the transient response in $\theta_j$, where $j \ne k$, by means of feed-forward control to $u_j$. In order to perform this function, the control assembly 207 operates as follows. If the difference between end and start values is denoted $\Delta u_k$, the control to the switched mirror is $u_k = \Delta u_k \cdot f(\cdot)$. Though disturbance is minimized, the neighboring mirrors have a residual disturbance that can be characterized with the normalized function $g(\cdot)$.

Experimental work as well as fluid dynamic calculations has shown that the disturbance on neighboring mirrors in a MEMS device is proportional to the switched mirror velocity, as well as the switched rotation angle. Furthermore, the dynamic equations of fluid flow are well within a regime of laminar flow with constant gas density. The Reynolds's Number, as well as Knudsen Number, is much less than unity. These results suggest the system is linear and superposition can be applied. Using the assumption of linearity and superposition, the residual disturbance can be written as an equivalent disturbance in the control $u_j$, given by $u_j = a_{jk} \cdot \Delta u_k \cdot g(\cdot)$, where $a_{jk}$ is defined as a coupling coefficient from mirror k to mirror j. The control assembly 207 provides a feed-forward control strategy to counteract the equivalent disturbance control with an additive control $u_j = -a_{jk} \cdot \Delta u_k \cdot g(\cdot)$ which cancels the disturbance from the $k^{th}$ mirror. The total feed-forward control of the $j^{th}$ mirror is the summation over all switched mirrors, $$u_i = \Sigma_{all\ k} - a_{jk} \cdot \Delta u_k \cdot g(\cdot),$$

where $k$ is the index of switched mirrors & $a_{kk} = 0$

The disturbance appreciably affects only neighboring mirrors (e.g., mirrors in relative close proximity to the switched mirrors), not the entire mirror array. Therefore the calculation of $u_j$ is only necessary or desirable over a subset of all neighboring or static mirrors. For example, in one embodiment, the control assembly 207 only considers the neighboring +/−N mirrors adjacent to the switched mirrors. Another way of stating this analytically is the coefficient $a_{jk}=0$ for $|j-k|>N$. The value of N may vary based on the physical geometry of the MEMS device. In one embodiment N may equal 5. The coefficients $a_{jk}$ can be gathered into a coupling matrix A that has a zero main diagonal and upper and lower five diagonals populated with non-zero coefficients. The feed-forward control can then be written as $u=A \cdot \Delta u_k \cdot g(\cdot)$.

The coupling coefficients may be determined using an automated script to exercise the device by sequentially switching each mirror repeatedly while measuring the disturbance in neighboring mirrors using an optical detector. The coupling coefficient, $a_{jk}$, is then adjusted to minimize the disturbance. This is repeated for each mirror and its adjacent neighbors until the needed diagonals are filled in the coupling matrix A.

While the present embodiment applies the compensation function to the roll axis, in alternate embodiments, another compensation function may be applied to the pitch axis as well.

Figure 4:
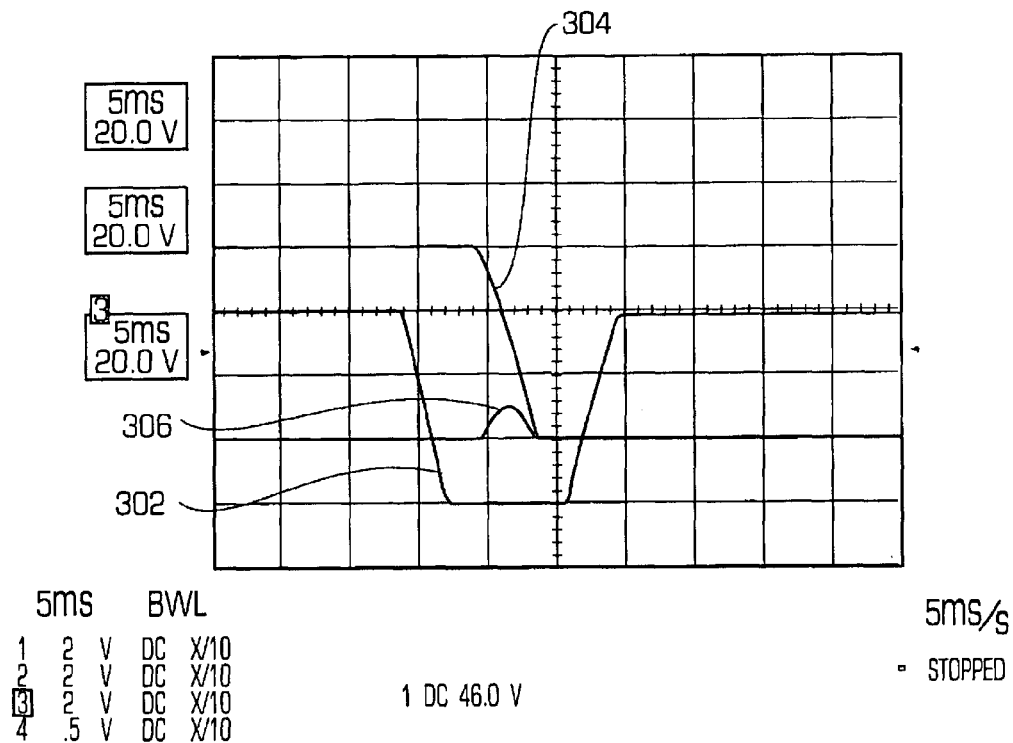
FIG. 4 illustrates examples of DAC profiles that may be used with the present invention.
Figure 5:
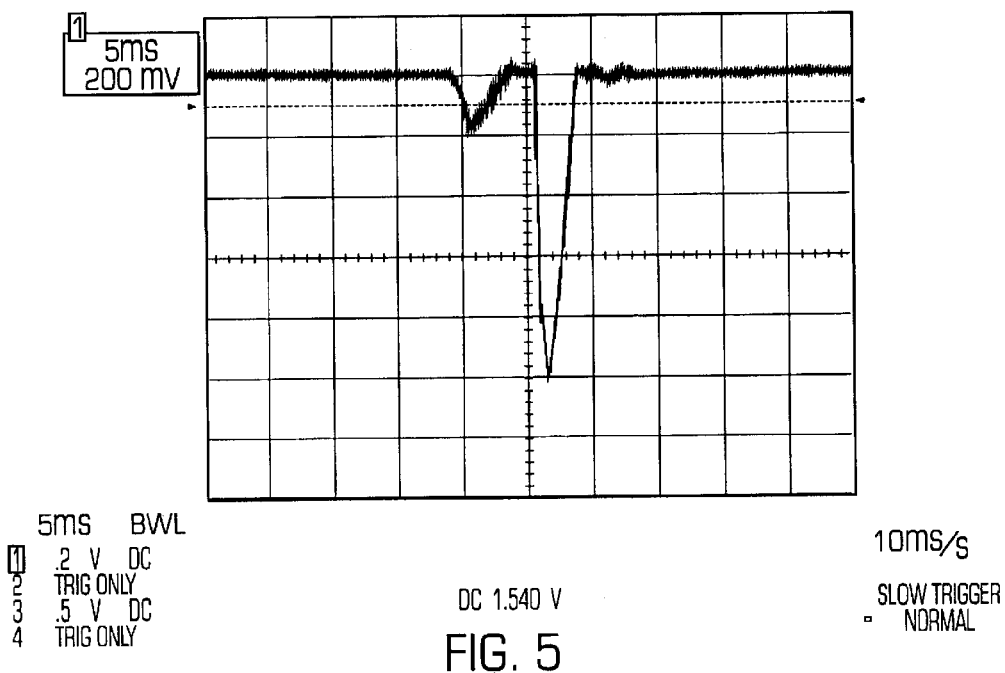
FIG. 5 illustrates optical disturbance in a conventional optical system including a MEMS device that does not employ the present invention.
Figure 6:
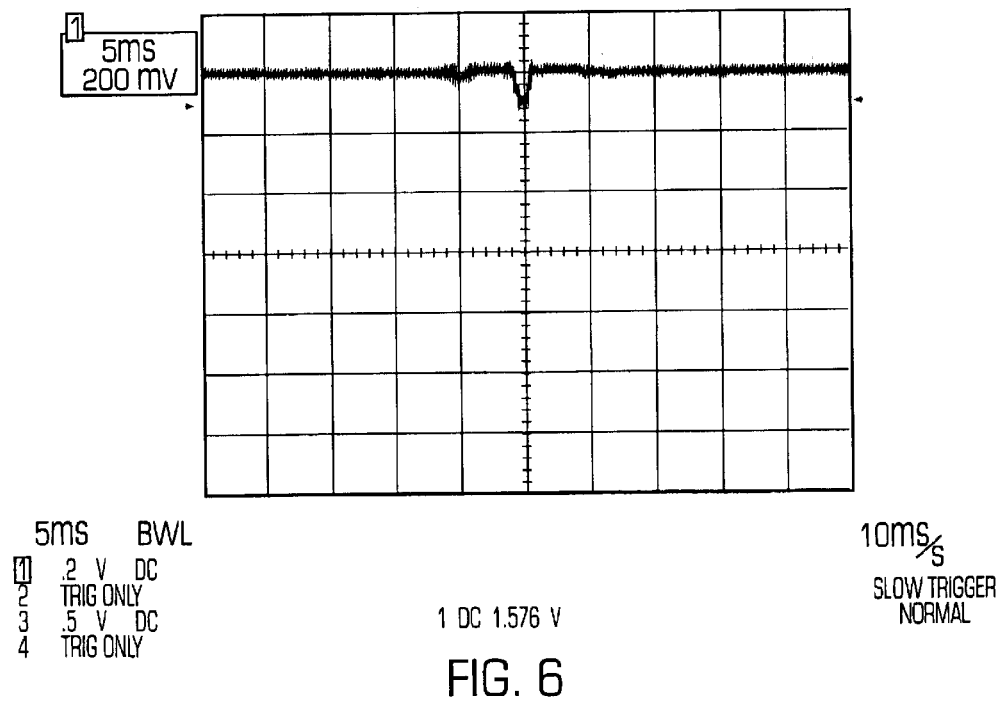
FIG. 6 illustrates optical disturbance in an optical system including a MEMS device that employs the present invention.

The feasibility of this invention was demonstrated in the Capella Photonics WavePath 4500, an optical routing system including a micromirror array. FIGS. 5 and 6 are exemplary plots demonstrating results without using feed-forward control (FIG. 5) and results using the feed-forward control of the present invention (FIG. 6). FIG. 4 illustrates exemplary DAC profiles for two mirrors. In this case, Mirror 1 is switched from a source port to a destination port. Mirror 1 rotates first on the pitch axis (curve 302) and then on the roll axis (curve 304), to communicate the respective wavelength to the destination port. Next, the pitch axis (curve 302) is rotated back to optimal position. These DAC transitions correspond with the profile $f(\cdot)$ described above. In this example, simultaneous with the rotation of Mirror 1 on its roll axis (profile 304), the disturbance to Mirror 2 about the roll axis from aerodynamic coupling is compensated for by a feed-forward control signal using the profile $g(\cdot)$ (curve 306). Other embodiments may compensate Mirror 2, as well as neighboring mirrors, for pitch and roll motions of the switched mirror. As shown in FIGS. 5 and 6, the disturbance on the non-switched mirror is effectively canceled or substantially reduced using the present invention (e.g., 8.3 dB versus 0.5 dB).

Those skilled in the art will recognize that the exemplary embodiments described above provide only a few of many optical systems that can be constructed according to the present invention. Various means and methods can be devised to perform the designated functions in an equivalent manner. Moreover, various changes, substitutions, and alternations can be made herein without departing from the principles and the scope of the present invention. Accordingly, the scope of the present invention should be determined by the following claims and their legal equivalents.

What is claimed is:

1. An optical system comprising:
   a MEMS device, including a plurality of elements, which are individually movable; and
   a control assembly that is communicatively coupled to the MEMS device and that provides control signals to the plurality of elements for moving the elements, wherein the control signals include feed-forward signals to certain non-moving elements that substantially cancel disturbance caused by moving elements.

2. The optical system of claim 1 wherein the plurality of elements comprise micromirrors.

3. The optical system of claim 1 wherein the plurality of elements are arranged in a one dimensional array.

4. The optical system of claim 1 wherein the plurality of elements are arranged in a two-dimensional array.

5. The optical system of claim 1 wherein each of the plurality of elements is rotatable about at least one axis.

6. The optical system of claim 1 wherein each of the plurality of elements is rotatable about two or more axes.

7. The optical system of claim 1 wherein the control signals comprise DAC voltage values that command corresponding rotational angles in the elements.

8. The optical system of claim 1 wherein the certain non-moving elements comprise a predetermined number of elements adjacent to each side of a moving element.

9. The optical system of claim 8, wherein the predetermined number of elements is based on physical properties of the MEMS device.

10. The optical system of claim 1 wherein the control assembly provides feed-forward control signals to non-moving elements according to the following equation:

$$u_j = \Sigma - a_{jk} \cdot \Delta u_k \cdot g(\cdot),$$

where element k is a moving element, $u_j$ is a feed-forward control signal to a non-moving element j, $a_{jk}$ is a coupling coefficient from element k to element j, $\Delta u_k$ is the difference between end and start values, and $g(\cdot)$ is a normalized function characterizing disturbance in non-moving elements.

11. The optical system of claim 10, wherein the summation is taken over all k, where k is an index of moving elements and $a_{kk}=0$.

12. The optical system of claim 11 wherein $a_{jk}=0$ for $|j-k|>N$.

13. The optical system of claim 1 wherein the control assembly provides feed-forward control signals to non-moving elements according to the equation:

$$u = A \cdot \Delta u_k \cdot g(\cdot),$$

where u is the feed-forward control signal to non-moving elements, A is a matrix of coupling coefficients from moving to non-moving elements, $\Delta u_k$ is the difference between end and start values, and $g(\cdot)$, is a normalized function characterizing disturbance in non-moving elements.

14. An optical apparatus for canceling disturbance in an array of MEMS mirrors, which are individually switchable, the apparatus comprising:
   a controller that is communicatively coupled to the MEMS mirrors and that communicates feed-forward signals to certain non-switched mirrors, effective to substantially cancel disturbances caused by switched mirrors.

15. The optical apparatus of claim 14 wherein the mirrors are arranged in a one-dimensional array.

16. The optical apparatus of claim 14 wherein the mirrors are arranged in a two-dimensional array.

17. The optical apparatus of claim 14 wherein each the mirrors is pivotable about at least one axes.

18. The optical apparatus of claim 14 wherein each of the mirrors is pivotable about two or more axes.

19. The optical apparatus of claim 14 wherein controller is further adapted to provide the control signals to switch the MEMS mirrors.

20. The optical apparatus of claim 19 wherein the control signals comprise DAC voltage values that command corresponding angles in the mirrors.

21. The optical apparatus of claim 14 wherein the certain non-switched mirrors comprise a predetermined number of mirrors adjacent to each side of a switched mirror.

22. The optical apparatus of claim 21, wherein the predetermined number of mirrors is based on physical properties of the MEMS mirrors.

23. The optical apparatus of claim 14 wherein the controller provides feed-forward signals to non-switched mirrors according to the following equation:

$$u_j = \Sigma - a_{jk} \cdot \Delta u_k \cdot g(\cdot),$$

where element k is a switched mirror, $u_j$ is the feed-forward control signal to a non-switched mirror j, $a_{jk}$ is a coupling coefficient from mirror k to mirror j, $\Delta u_k$ is the difference between end and start values, and $g(\cdot)$ is a normalized function characterizing disturbance in non-switched mirrors.

24. The optical apparatus of claim 22 wherein the summation is taken over all k, where k is an index of switched mirrors and $a_{kk}=0$.

25. The optical apparatus of claim 24 wherein $a_{jk}=0$ for $|j-k|>N$.

26. The optical apparatus of claim 14 wherein the controller provides the feed-forward signals to non-switched mirrors according to the equation:

$$u = A \cdot \Delta u_k \cdot g(\cdot),$$

where u is the feed-forward control signal to nonswitched mirrors, A is a matrix of coupling coefficients from switched to non-switched mirrors, $\Delta u_k$ is the difference between end and start values, and $g(\cdot)$ is a normalized function characterizing disturbance in non-switched mirrors.

27. A method of canceling disturbance in a MEMS device including a plurality of elements, which are individually movable, the method comprising:
providing feed-forward signals to one or more non-moving elements in the MEMS device, the feed-forward signals being effective to substantially cancel disturbance caused by moving elements in the MEMS device.

28. The method of claim 27 wherein the elements comprise micromirrors.

29. The method of claim 27 wherein the one or more non-moving elements comprise a predetermined number of elements adjacent to each side of a moving element.

30. The method of claim 29 wherein the predetermined number of elements is based on physical properties of the MEMS device.

31. The method of claim 27 wherein the control assembly provides feed-forward control signals to non-moving elements according to the following equation:

$$u_j = \Sigma - a_{jk} \cdot \Delta u_k \cdot g(\cdot),$$

where element k is a moving element $u_j$ is the feed-forward control signal to a non-moving element j, $a_{jk}$ is a coupling coefficient from element k to element j, $\Delta u_k$ is the difference between end and start values, and $g(\cdot)$ is a normalized function characterizing disturbance in non-moving elements.

32. The method of claim 31, wherein the summation is taken over all k where k is an index of moving elements and $a_{kk}=0$.

33. The method of claim 32 wherein $a_{jk}=0$ for $|j-k|>N$.

34. The method of claim 27 wherein the control assembly provides feed-forward control signals to non-moving elements according to the equation:

$$= A \cdot \Delta u_k \cdot g(\cdot),$$

where u is the feed-forward control signal to non-moving elements, A is a matrix of coupling coefficients from moving to non-moving elements, $\Delta u_k$ is the difference between end and start values, and $g(\cdot)$ is a normalized function characterizing disturbance in non-moving elements.

* * * * *